US008494284B2

(12) United States Patent
Parameswaran et al.

(10) Patent No.: US 8,494,284 B2
(45) Date of Patent: Jul. 23, 2013

(54) METHODS AND APPARATUSES FOR FACILITATING DETECTION OF TEXT WITHIN AN IMAGE

(75) Inventors: Vasudev Parameswaran, Fremont, CA (US); Shang-hsuan Tsai, Stanford, CA (US); Radek Grzeszczuk, Menlo Park, CA (US)

(73) Assignee: Nokia Corporation, Espoo (FI)

( * ) Notice: Subject to any disclaimer, the term of this patent is extended or adjusted under 35 U.S.C. 154(b) by 46 days.

(21) Appl. No.: 13/300,972

(22) Filed: Nov. 21, 2011

(65) Prior Publication Data

US 2013/0129222 A1 May 23, 2013

(51) Int. Cl.
*G06K 9/46* (2006.01)
*G06K 9/62* (2006.01)

(52) U.S. Cl.
USPC .......................................... 382/195; 382/224

(58) Field of Classification Search
USPC ................ 382/173, 181, 185, 195, 209, 218, 382/224
See application file for complete search history.

(56) References Cited

U.S. PATENT DOCUMENTS

2009/0285482 A1 11/2009 Epshtein et al.

FOREIGN PATENT DOCUMENTS

| EP | 0526196 | 2/1993 |
| WO | WO 2010/027933 A1 | 3/2010 |

OTHER PUBLICATIONS

Yi, Chucai; Tian, Yingli: "Text String Detection from Natural Scenes by Structure-Based Partition and Grouping"; IEEE Transactions on Image Processing; Issued Sep. 2011, vol. 20, Issue 9, pp. 2594-2605.
Weinman, Jerod J.; "Typographical Features for Scene Text Recognition"; 2010 IEEE; IAPR Proc. Conf. on Pattern Recognition, Istanbul, Turkey, Aug. 2010, 4 pages.
Crandall, David, et al.: "Extraction of Special Effects Caption Text Events from Digital Video"; International Journal on Document Analysis and Recognition, IJDAR; (2003) 5; pp. 138-157.
Shahab, Asif, et al.: "Bayesian Approach to Photo Time-Stamp Recognition"; 2011 International Conference on Document Analysis and Recognition; IEEE Computer Society 2011; pp. 1039-1043.
Zhong, Yu, et al.: "Automatic Caption Localization in Compressed Video"; IEEE Transactions on Pattern Analysis and Machine Intelligence, vol. 22, No. 4, Apr. 2000; pp. 385-392.
Chen, X. and Yuille, A.L.; "A Time-Efficient Cascade for Real-Time Object Detection: with applications for the visually impaired"; 1st International Workshop on Computer Vision Applications for the Visually Impaired (CVACVI); Workshop in Association with CVPR Jun. 20, 2005; San Diego; pp. 1-8.
Clavelli, Antonio and Karatzas, Dimosthenis; "Text Segmentation in Colour Posters from the Spanish Civil War Era"; 2009 10th International Conference on Document Analysis and Recognition; IEEE Computer Society; pp. 181-185.

(Continued)

*Primary Examiner* — Daniel Mariam
(74) *Attorney, Agent, or Firm* — Alston & Bird LLP

(57) ABSTRACT

Methods and apparatuses are provided for facilitating detection of text within an image. A method may include calculating an alpha value associated with an image region containing a hypothesized text fragment. The alpha value may be defined as a function of a curved character length distribution, a character width distribution, and an inter-character spacing distribution for the hypothesized text fragment. The method may additionally include calculating a gamma value based at least in part on an interval length distribution determined for the hypothesized text fragment. The method may also include classifying whether the image region is a text-containing region based at least in part on the calculated alpha and gamma values. Corresponding apparatuses are also provided.

20 Claims, 10 Drawing Sheets

OTHER PUBLICATIONS

Epshtein, Boris; Ofek, Eyal; Wexler, Yonatan; "Detecting Text in Natural Scenes with Stroke Width Transform"; 2010 IEEE; pp. 2963-2970.

Chen, Huizhong, et al:, "Robust text detection in natural images with edge-enhanced maximally stable extremal regions", IEEE International Conference on Image Processing (ICIP), Sep. 2011; pp. 1-4.

Canny, John; "A Computational Approach to Edge Detection"; IEEE Transactions on Pattern Analysis and Machine Intelligence; vol. PAMI-8, No. 6; Nov. 1986; pp. 679-698.

Matas, J., et al.: "Robust Wide Baseline Stereo from Maximally Stable Extremal Regions"; BMVC 2002; pp. 384-393.

Neumann, Lukas and Matas, Jiri; "Text Localization in Real-World Images Using Efficiently Pruned Exhaustive Search"; 2011 International Conference on Document Analysis and Recognition; pp. 687-691.

Retornaz, Thomas and Marcotegui, Beatriz; "Scene text localization based on the ultimate opening"; Proceedings of the 8th International Symposium on Mathematical Morphology, Rio de Janeiro, Brazil, Oct. 10-13, 2007; pp. 177-188.

Mandarim-De-Lacerda, Carlos A.; "Stereological tools in biomedical research"; Anais da Academia Brasileira de Ciencias (2003) 75(4) (Annals of the Brazilian Academy of Sciences); pp. 469-486.

Neumann, Lukas and Matas, Jiri; "A method for text localization and recognition in real-world images"; Published at the 10th Asian Conference on Computer Vision, Queenstown, New Zealand, ACCV 2010, Nov. 8-12, 2010; pp. 1-14.

Leon, Miriam; Mallo, Sergio and Gasull, Antoni; "A Tree Structured-Based Caption Text Detection Approach"; Proceedings of the Fifth IASTED International Conference, Visualization, Imaging and Image Processing; Sep. 7-9, 2005; Benidorm, Spain; pp. 220-225.

Otsu, Nobuyuki; "A Threshold Selection Method from Gray-Level Histograms"; IEEE Transactions on Systems, Man and Cybernetics; vol. SMC-9, No. 1; Jan. 1979; pp. 62-66.

Liu, Ce; Freeman, William T., et al.: "Noise Estimation from a Single Image"; Proceedings of the 2006 IEEE Computer Society Conference on Computer Vision and Pattern Recognition, (CVPR '06); pp. 1-8.

Clark, P., et al.; "Finding text regions using localised measures;" 11th British Machine Vision Conference (BMVC2000); Sep. 11-14, 2000; Bristol, UK; pp. 675-684; retrieved on Dec. 26, 2012 from <http://www.google.com/url?sa=t&rct=j&q=&esrc=s&frm=1&source=web&cd=1&cad=rja&ved=0CDwQFjAA&url=http%3A%2F%2Fwww.bmva.org%2Fbmvc%2F2000%2Fpapers%2Fp68.pdf&ei=LGTbUNWTG-22OQH_toDQCA&usg=AFQjCNGdCwC-r0Ljh2ri7g9-cXYIC8LxwA&sig2=u2RIz234nmRQ6JjjxI4KKQ&bvm=bv.1355534169,d.dmQ>.

International Search Report and Written Opinion of the Searching Authority for Application No. PCT/FI2012/050961, dated Dec. 5, 2012.

Jung, K., et al.; "Text information extraction in images and video: A survey;" Pattern Recognition; vol. 5; May 2004; pp. 977-997; retrieved on Dec. 26, 2012 from <www.ctie.monash.edu.au/terry/text%20from%20images.pdf>.

Huang, Yuman and Klette, Reinhard; "A Comparison of Property Estimators in Stereology and Digital Geometry"; Springer (2005) pp. 1-16.

METHODS AND APPARATUSES FOR FACILITATING DETECTION OF TEXT WITHIN AN IMAGE

TECHNOLOGICAL FIELD

Embodiments of the present invention relate generally to image processing technology and, more particularly, relate to methods and apparatuses for facilitating detection of text within an image.

BACKGROUND

The modern computing era has brought about a rapid expansion in computing power, resulting in development of affordable and powerful computing devices. Usage of modern computing devices has become nearly ubiquitous among consumers across the spectrum of socioeconomic backgrounds. These modern computing devices may be capable of performing a variety of image-based services, including, for example, include augmented reality applications, point of interest navigation services, and/or other applications in which images of a user's surroundings may be captured and augmented with additional contextual information that may be derived by processing the images. As a further example, three-dimensional mapping technology may use captured real-world images to produce three-dimensional maps including three-dimensional position information and content related to points of interest that may be derived from image context.

Such image-based services may rely on and/or be enhanced through the detection of text within captured real world images. In this regard, text recognized within a real world image may be used to facilitate point of interest recognition, provide audio read back of captured text, provide language translation services for foreign travelers, and/or the like. However, text detection within images continues to be problematic. In this regard, while text detection in images has been used within the document recognition domain, text detection in natural world images, such as outdoor scenes, has proved to be considerably more difficult, due to challenges arising due to the large variety of text fonts and styles, camera viewpoints, image contrasts, and other factors affecting the visibility of text within a captured natural world image. Further, whereas document text may be the primary focus within a captured image in the document recognition domain, the text footprint within a natural world image is typically a very small fraction of the image (often occupying hundreds of pixels in an image of several tens of megapixels).

BRIEF SUMMARY

Methods, apparatuses, and computer program products are herein provided for facilitating text detection within an image. Methods, apparatuses, and computer program products in accordance with various embodiments may provide several advantages to computing devices, computing device users, and service providers. More particularly, some example embodiments provide for detection of text in an image that may be of particular benefit to detection of text within a natural world image, such as an outdoor image, in which a variety of font styles and sizes may exist, and in which background contrast may otherwise hinder text detection. In this regard, some example embodiments provide for text detection independent of the font, letter-style, language, and orientation of the text within the natural world image. More particularly, some example embodiments utilize properties of text that may be independent of font, letter-style, and language that may provide for faster detection of text than previous methods through use of calculations that may be more rapidly performed on the basis of a model of understood properties of text. Further, the model-based text detection approach provided by some example embodiments may be more reliable than prior heuristics-based approaches. Some example embodiments further provide the ability to specify performance bounds for text detection such that a certain detection rate may be provided in accordance with known text properties that may be defined by a text model, thereby enabling a user to tune text detection to satisfy desired performance bounds.

In a first example embodiment, a method is provided, which may comprise calculating an alpha value associated with an image region containing a hypothesized text fragment. The alpha value may be defined as a function of a curved character length distribution, a character width distribution, and an inter-character spacing distribution for the hypothesized text fragment. The method of this example embodiment may further comprise calculating a gamma value based at least in part on an interval length distribution determined for the hypothesized text fragment. The method of this example embodiment may also comprise classifying whether the image region is a text-containing region based at least in part on the calculated alpha and gamma values.

In another example embodiment, an apparatus is provided. The apparatus of this example embodiment may comprise at least one processor and at least one memory storing computer program code. The at least one memory and stored computer program code may be configured, with the at least one processor, to cause the apparatus of this example embodiment to at least calculate an alpha value associated with an image region containing a hypothesized text fragment. The alpha value may be defined as a function of a curved character length distribution, a character width distribution, and an inter-character spacing distribution for the hypothesized text fragment. The at least one memory and stored computer program code may be configured, with the at least one processor, to further cause the apparatus of this example embodiment to calculate a gamma value based at least in part on an interval length distribution determined for the hypothesized text fragment. The at least one memory and stored computer program code may be configured, with the at least one processor, to additionally cause the apparatus of this example embodiment to classify whether the image region is a text-containing region based at least in part on the calculated alpha and gamma values.

In another example embodiment, a computer program product is provided. The computer program product of this embodiment includes at least one computer-readable storage medium having computer-readable program instructions stored therein. The program instructions of this example embodiment may comprise program instructions configured to calculate an alpha value associated with an image region containing a hypothesized text fragment. The alpha value may be defined as a function of a curved character length distribution, a character width distribution, and an inter-character spacing distribution for the hypothesized text fragment. The program instructions of this example embodiment may further comprise program instructions configured to calculate a gamma value based at least in part on an interval length distribution determined for the hypothesized text fragment. The program instructions of this example embodiment may additionally comprise program instructions configured to classify whether the image region is a text-containing region based at least in part on the calculated alpha and gamma values.

In yet another example embodiment, an apparatus is provided that may comprise means for calculating an alpha value associated with an image region containing a hypothesized text fragment. The alpha value may be defined as a function of a curved character length distribution, a character width distribution, and an inter-character spacing distribution for the hypothesized text fragment. The apparatus of this example embodiment may further comprise means for calculating a gamma value based at least in part on an interval length distribution determined for the hypothesized text fragment. The apparatus of this example embodiment may also comprise means for classifying whether the image region is a text-containing region based at least in part on the calculated alpha and gamma values.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
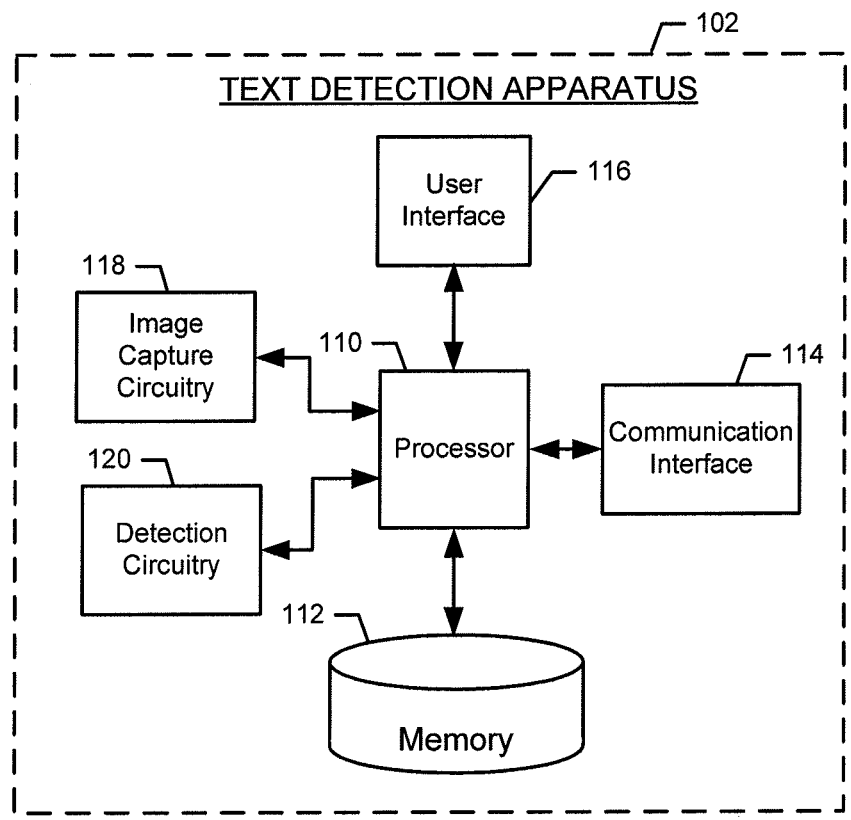
Figure 2:
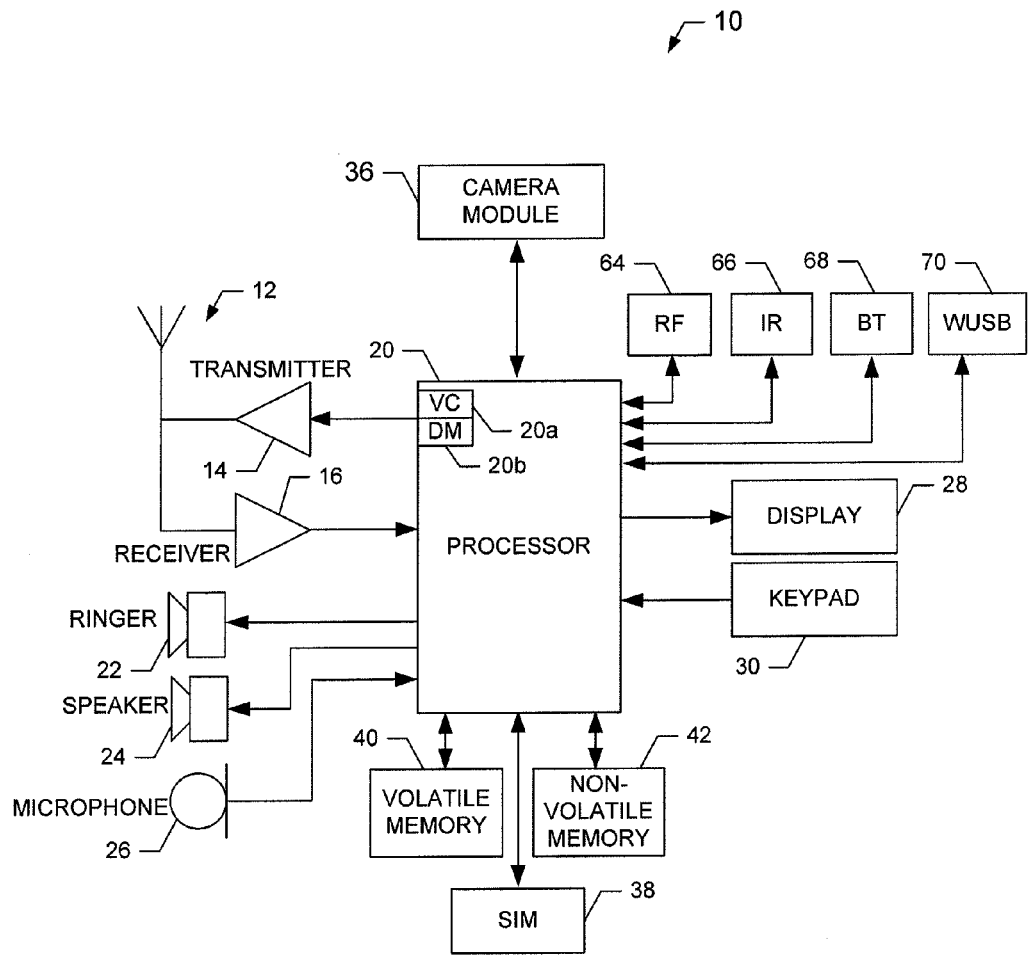
Figure 3:
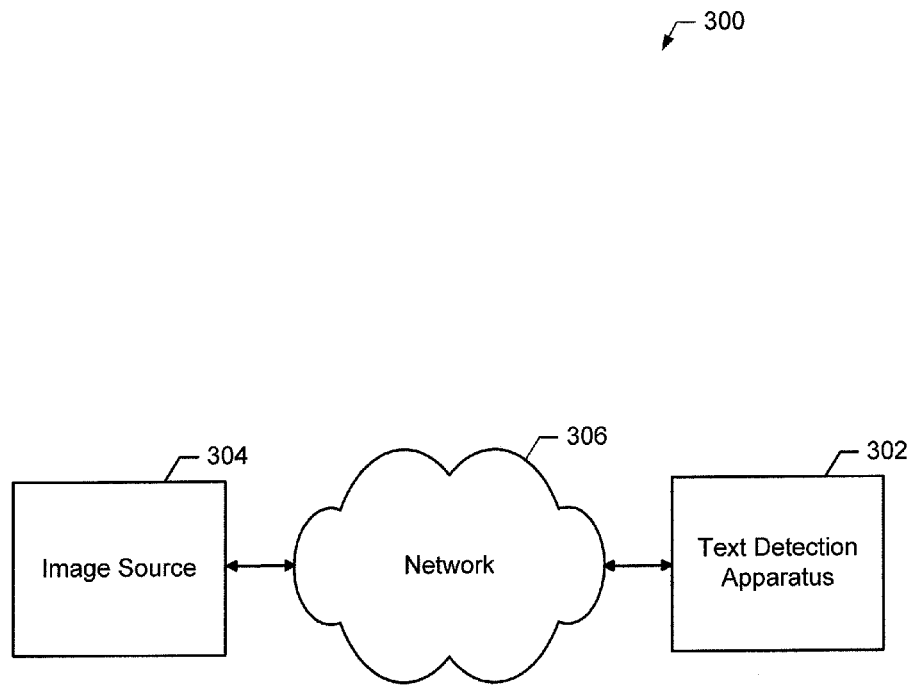
Figure 4:
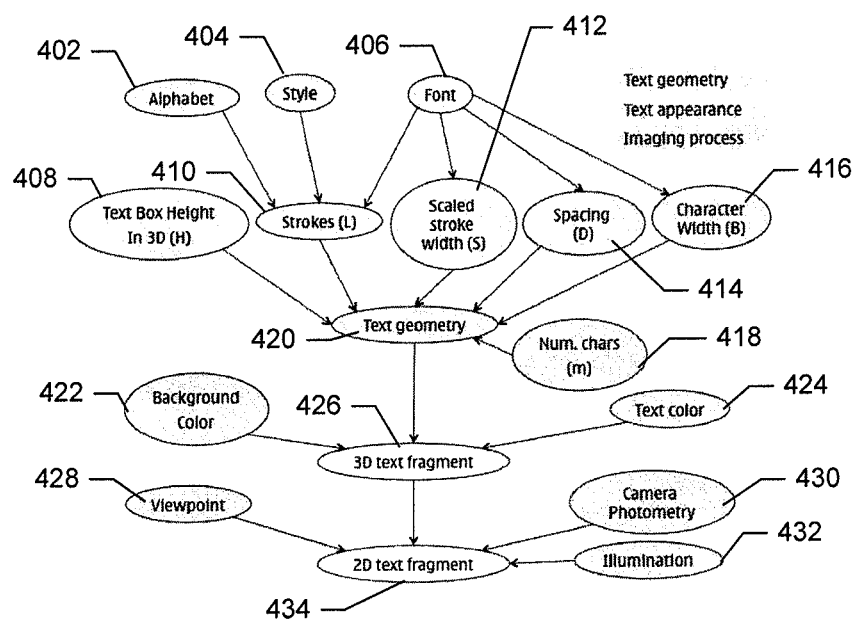
Figure 5:
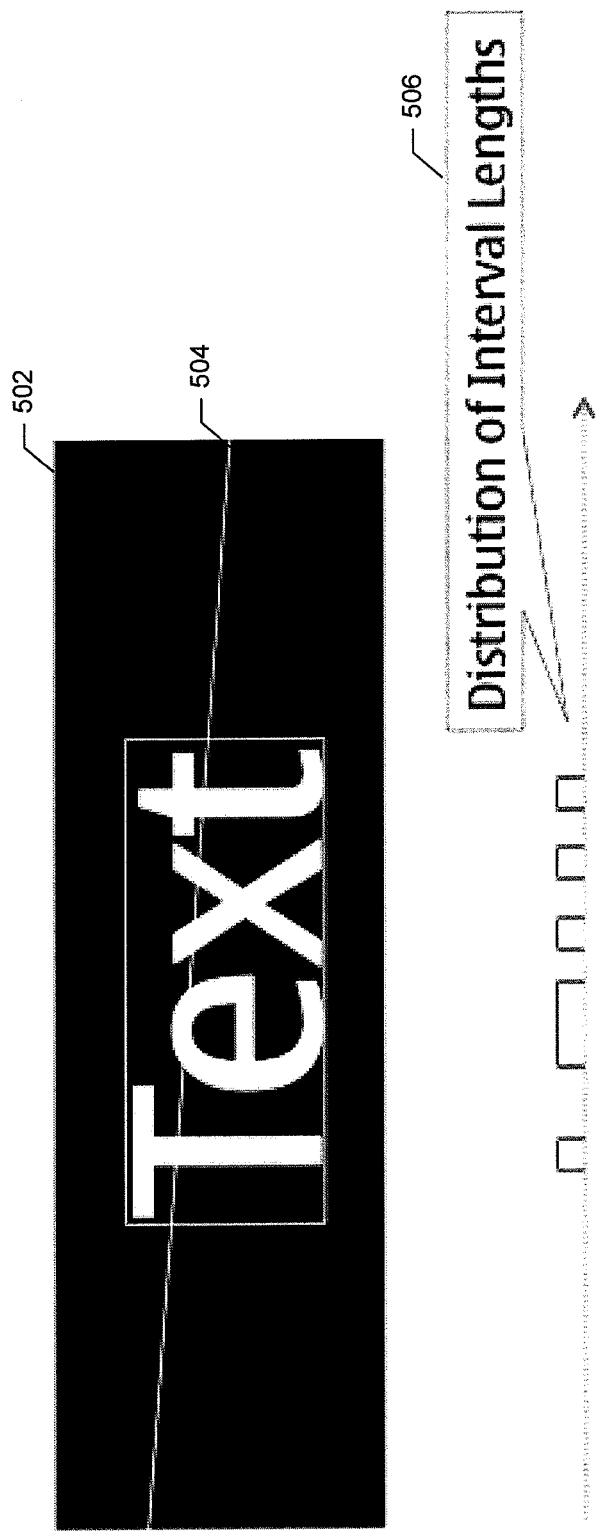
Figure 6:
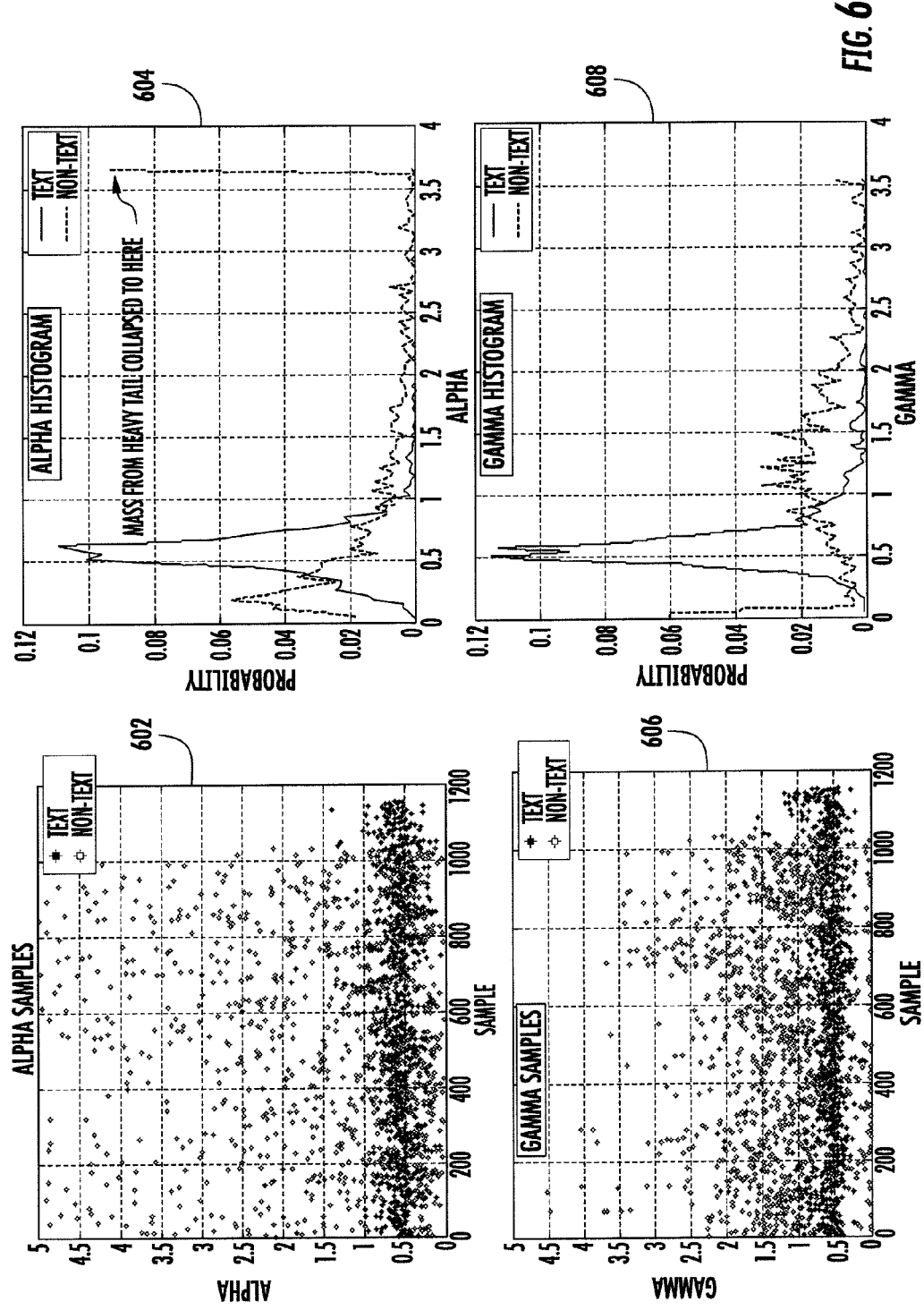
Figure 7:
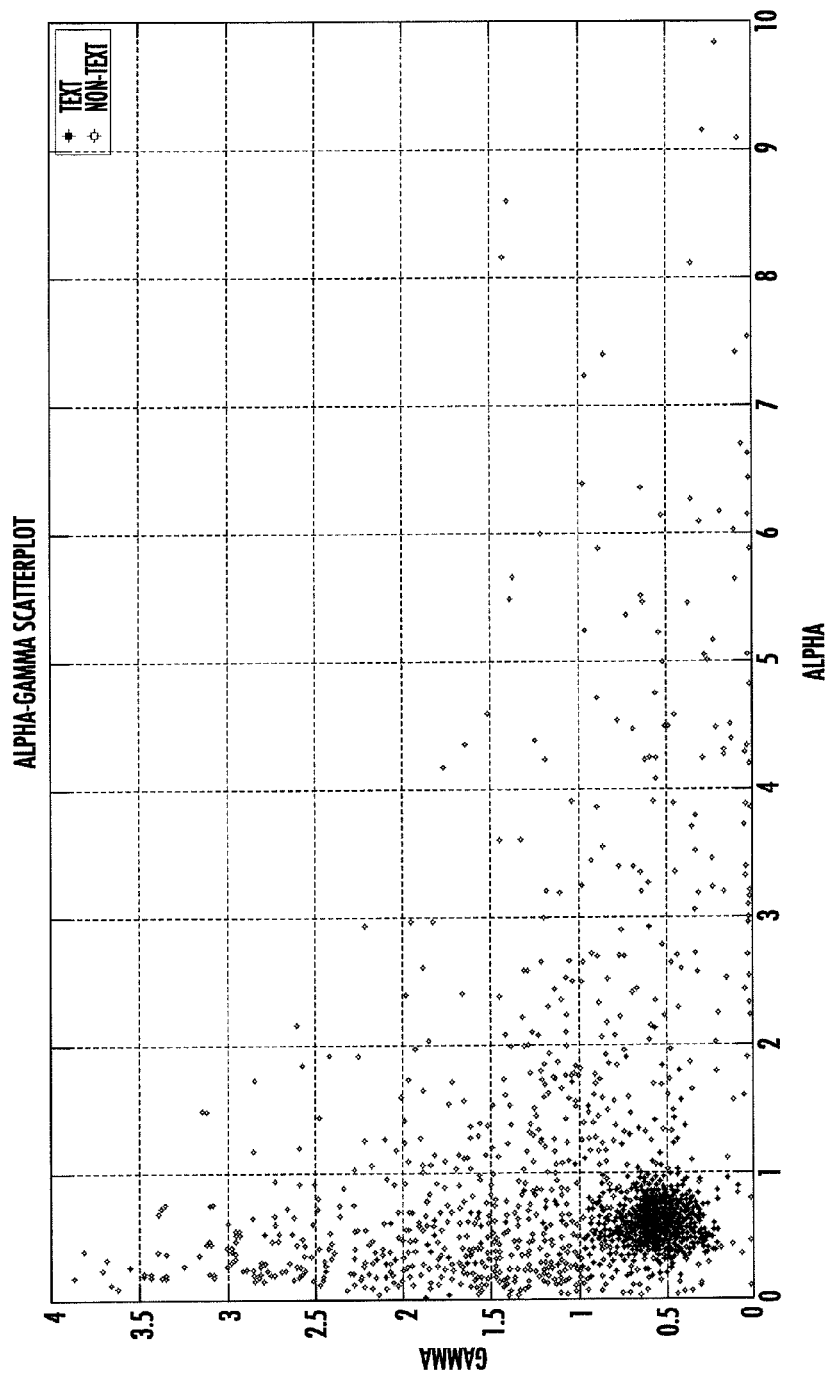
Figure 8:
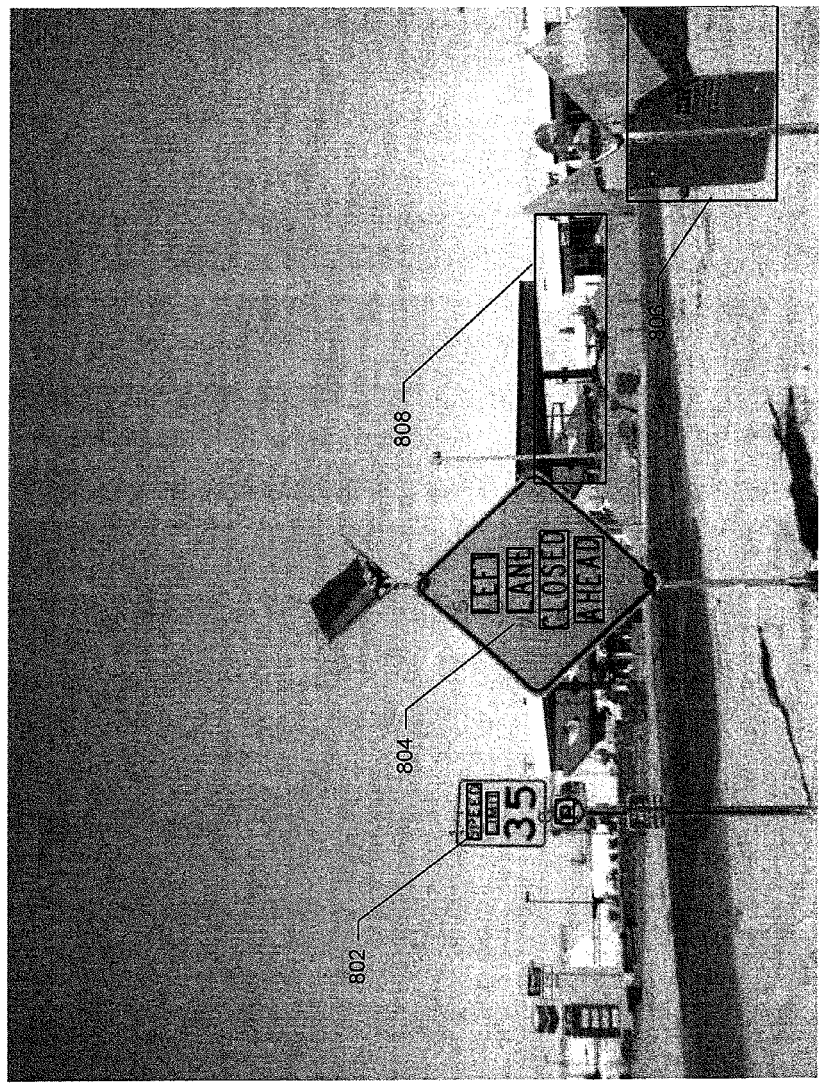
Figure 9:
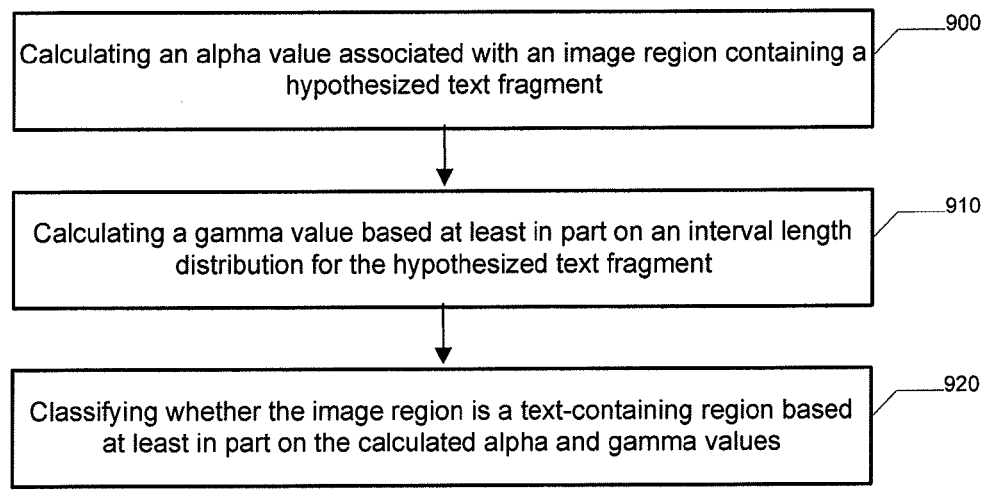
Figure 10:
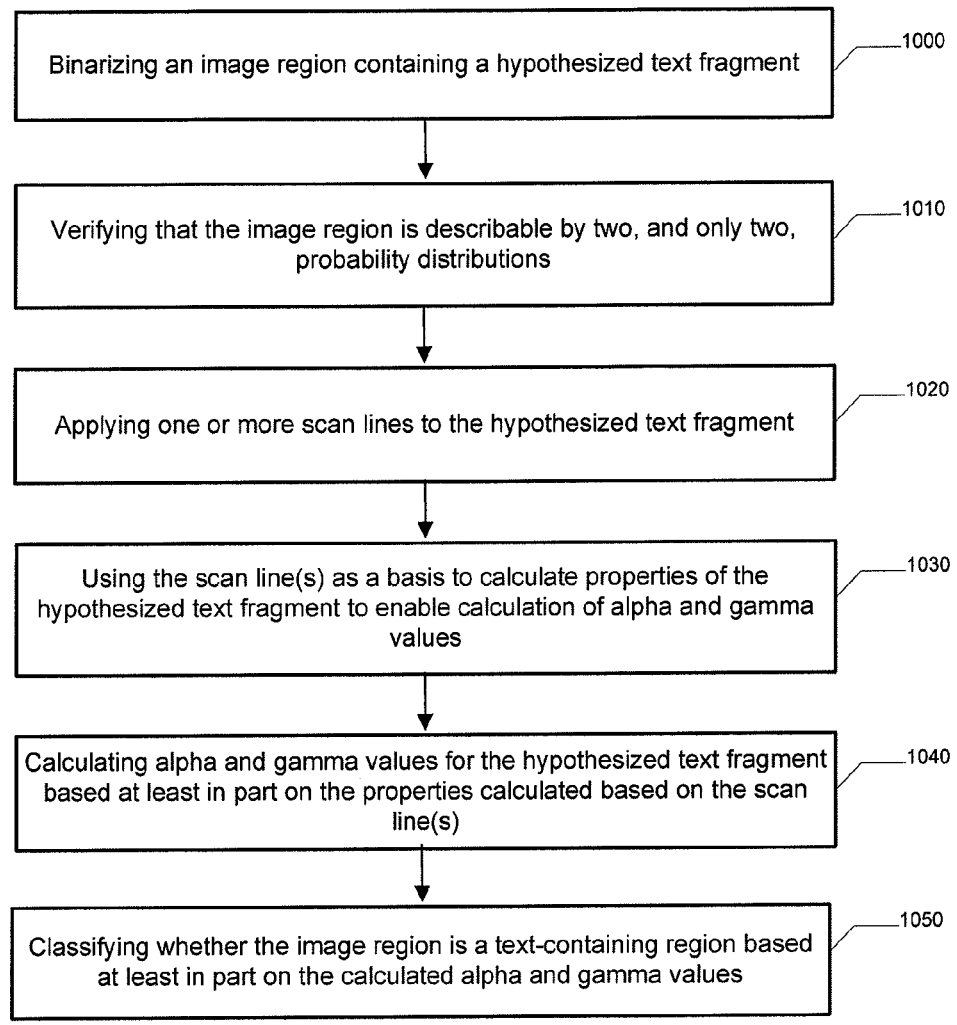

Having thus described embodiments of the invention in general terms, reference will now be made to the accompanying drawings, which are not necessarily drawn to scale, and wherein:

FIG. 1 illustrates a block diagram of a text detection apparatus for facilitating detection of text within an image according to some example embodiments;

FIG. 2 is a schematic block diagram of a mobile terminal according to some example embodiments;

FIG. 3 illustrates a system for performing text detection according to some example embodiments;

FIG. 4 illustrates an example Bayesian Network for word generation in accordance with some example embodiments, which may be used to describe influencing variables and effects on text that within a captured image;

FIG. 5 illustrates application of a scan line across a hypothesized text fragment in accordance with some example embodiments;

FIG. 6 illustrates alpha and gamma values calculated for a set of training data which may be used as a model for classifying hypothesized text fragments in accordance with some example embodiments;

FIG. 7 illustrates an example scatterplot for alpha and gamma values;

FIG. 8 illustrates sample classification results in accordance with some example embodiments;

FIG. 9 illustrates a flowchart according to an example method facilitating detection of text within an image according to some example embodiments; and FIG. 10 illustrates a flowchart according to another example method facilitating detection of text within an image according to some example embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of a text detection apparatus 102 for facilitating detection of text within an image according to some example embodiments. It will be appreciated that the text detection apparatus 102 is provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of an apparatus for facilitating detection of text within an image, other configurations may also be used to implement embodiments of within the scope of the disclosure.

The text detection apparatus 102 may be embodied as a desktop computer, laptop computer, mobile terminal, mobile computer, mobile phone, mobile communication device, tablet computing device, one or more servers, one or more network nodes, game device, digital camera/camcorder, audio/video player, television device, radio receiver, digital video recorder, positioning device, a chip set, an apparatus comprising a chipset, any combination thereof, and/or the like. In an example embodiment, the text detection apparatus 102 may be embodied as a mobile terminal, such as that illustrated in FIG. 2.

In this regard, FIG. 2 illustrates a block diagram of a mobile terminal 10 representative of one embodiment of a text detection apparatus 102. It should be understood, however, that the mobile terminal 10 illustrated and hereinafter described is merely illustrative of one type of text detection apparatus 102 that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), protocols that may be developed in the future, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 4G wireless communication protocols such as Long Term Evolution (LTE), LTE Advanced(LTE-A), Evolved Universal Terrestrial Radio Access Network (E-UTRAN), and/or the like.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

The mobile terminal 10 may include a media capturing element, such as a camera, video and/or audio module, in communication with the processor 20. The media capturing element may comprise any means for capturing an image, video and/or audio for storage, display or transmission. For example, in some example embodiments in which the media capturing element comprises camera module 36, the camera module 36 may include a digital camera configured to form a digital image file from a captured image. In addition, the digital camera of the camera module 36 may be configured to capture a video clip. As such, the camera module 36 may include all hardware, such as a lens or other optical component(s), and software necessary for creating a digital image file from a captured image as well as a digital video file from a captured video clip. Alternatively, the camera module 36 may include only the hardware needed to view an image, while a memory device of the mobile terminal 10 stores instructions for execution by the processor 20 in the form of software necessary to create a digital image file from a captured image. As yet another alternative, an object or objects within a field of view of the camera module 36 may be displayed on the display 28 of the mobile terminal 10 to illustrate a view of an image currently displayed which may be captured if desired by the user. As such, a captured image may, for example, comprise an image captured by the camera module 36 and stored in an image file. As another example, a captured image may comprise an object or objects currently displayed by a display or viewfinder of the mobile terminal 10, but not necessarily stored in an image file. In some example embodiments, the camera module 36 may further include a processing element such as a co-processor configured to assist the processor 20 in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in some example embodiments, the text detection apparatus 102 includes various means for performing the various functions herein described. These means may comprise one or more of a processor 110, memory 112, communication interface 114, user interface 116, image capture circuitry 118, or detection circuitry 120. The means of the text detection apparatus 102 as described herein may be embodied as, for example, circuitry, hardware elements (e.g., a suitably programmed processor, combinational logic circuit, and/or the like), a computer program product comprising a computer-readable medium (for example, memory 112) storing computer-readable program instructions (e.g., software or firmware) that may be performed by a suitably configured processing device (e.g., the processor 110), or some combination thereof.

In some example embodiments, one or more of the means illustrated in FIG. 3 may be embodied as a chip or chip set. In other words, the communication apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, one or more of the processor 110, memory 112, communication interface 114, user interface 116, image capture circuitry 118, and detection circuitry 120, or some combination thereof may be embodied as a chip or chip set. The text detection apparatus 102 may therefore, in some example embodiments, be configured to implement embodiments of the present invention on a single chip or as a single "system on a chip." As another example, in some example embodiments, the text detection apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the text detection apparatus 102 as described herein. The plurality of processors may be embodied on a single computing device or distributed across a plurality of computing devices collectively configured to function as the text detection apparatus 102. In embodiments wherein the text detection apparatus 102 is embodied as a mobile terminal 10, the processor 110 may be embodied as or comprise the processor 20. In some example embodiments, the processor 110 may be configured to execute instructions stored in the memory 112 or otherwise accessible to the processor 110. These instructions, when executed by the processor 110, may cause the text detection apparatus 102 to perform one or more of the functionalities of the text detection apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the text detection apparatus 102. In various example embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the text detection apparatus 102 is embodied as a mobile terminal 10, the memory 112 may comprise the volatile memory 40 and/or the non-volatile memory 42. The memory 112 may be configured to store information, data, applications, instructions, or the like for enabling the text detection apparatus 102 to carry out various functions in accordance with various example embodiments. For example, in at least some embodiments, the memory 112 is configured to buffer input data for processing by the processor 110. Additionally or alternatively, in at least some embodiments, the memory 112 may be configured to store program instructions for execution by the processor 110. The memory 112 may store information in the form of static and/or dynamic information. The stored information may include, for example, models used for face detection, images, videos, video frames, and/or the like. This stored information may be stored and/or used by the image capture circuitry 118 and/or detection circuitry 120 during the course of performing their functionalities.

The communication interface 114 may be embodied as any device or means embodied in circuitry, hardware, a computer program product comprising a computer-readable medium (for example memory 112) storing computer-readable program instructions (e.g., software or firmware) that may be performed by a suitably configured processing device (e.g., the processor 110), or a combination thereof that is configured to receive and/or transmit data from/to another computing device. For example, the communication interface 114 may be configured to receive data representing an image or video over a network. In this regard, in embodiments wherein the text detection apparatus 102 comprises a server, network node, or the like, the communication interface 114 may be configured to communicate with a remote image source (e.g., the image source 304) to receive an image that may be processed by the text detection apparatus 102 to detect text within the image in accordance with one or more example embodiments. In some example embodiment, the communication interface 114 may be at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the text detection apparatus 102 and one or more computing devices may be in communication. The communication interface 114 may additionally be in communication with the memory 112, user interface 116, image capture circuitry 118, and/or detection circuitry 120, such as via a bus(es).

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. In embodiments wherein the text detection apparatus 102 is embodied as one or more servers, aspects of the user interface 116 may be reduced or the user interface 116 may even be eliminated. The user interface 116 may be in communication with the memory 112, communication interface 114, image capture circuitry 118, and/or detection circuitry 120, such as via a bus(es).

In some, example embodiments, the text detection apparatus 102 may include image capture circuitry 118. It will be appreciated, however, that in some example embodiments, the image capture circuitry 118 may be excluded. The image capture circuitry 118 may be embodied as various means, such as circuitry, hardware, a computer program product comprising a computer-readable medium (for example memory 112) storing computer-readable program instructions (e.g., software or firmware) that may be performed by a suitably configured processing device (e.g., the processor 110), or some combination thereof and, in one embodiment, is embodied as or otherwise controlled by the processor 110. In embodiments wherein the image capture circuitry 118 is embodied separately from the processor 110, the image capture circuitry 118 may be in communication with the processor 110. The image capture circuitry 118 may further be in communication with one or more of the memory 112, communication interface 114, user interface 116, or detection circuitry 120, such as via a bus(es).

The image capture circuitry 118 may comprise hardware configured to capture an image and/or video. In this regard, the image capture circuitry 118 may comprise a camera lens and/or other optical components for capturing a digital image. As another example, the image capture circuitry 118 may comprise circuitry, hardware, a computer program product, or some combination thereof that is configured to direct the capture of an image by a separate camera module that may be embodied on or otherwise operatively connected to the text detection apparatus 102. In embodiments wherein the text detection apparatus 102 is embodied as a mobile terminal 10, the image capture circuitry 118 may comprise the camera module 36 and/or may be configured to control capture of an image by the camera module 36.

The detection circuitry 120 may be embodied as various means, such as circuitry, hardware, a computer program product comprising a computer-readable medium (for example memory 112) storing computer-readable program instructions (e.g., software or firmware) that may be performed by a suitably configured processing device (e.g., the processor 110), or some combination thereof and, in one embodiment, is embodied as or otherwise controlled by the processor 110. In embodiments wherein the detection circuitry 120 is embodied separately from the processor 110, the detection circuitry 120 may be in communication with the processor 110. The detection circuitry 120 may further be in communication with one or more of the memory 112, communication interface 114, user interface 116, or image capture circuitry 118, such as via a bus(es).

FIG. 3 illustrates a system 300 for performing text detection according to some example embodiments. The system 300 comprises a text detection apparatus 302 and an image source 304 configured to communicate over the network 306. The text detection apparatus 302 may, for example, comprise an embodiment of the text detection apparatus 102 wherein the text detection apparatus 102 wherein the text detection apparatus 102 may be configured to receive an image and/or access an image from the image source 304 over the network 306 in order to detect text within the image. The network 306 may comprise a wireline network, wireless network (e.g., a cellular network, wireless local area network, wireless wide area network, some combination thereof, or the like), or a combination thereof, and in some example embodiments may comprise the interne.

The image source 304 may comprise any computing device configured to access the network 306 and communicate with the text detection apparatus 302 in order to provide an image to the text detection apparatus 302. In this regard, the image source 304 may comprise any apparatus that may be configured to capture and/or store images. By way of example, the image source 304 may, for example, be embodied as a desktop computer, laptop computer, mobile terminal, mobile computer, mobile phone, mobile communication device, tablet computing device, mobile terminal 10, game device, digital camera/camcorder, audio/video player, television device, camera device, digital video recorder, a network attached storage device, any combination thereof, and/or the like.

As such, in the example system illustrated in FIG. 3, the text detection apparatus 302 may be configured to access and/or receive an image (e.g., a still image, video clip, video frame, and/or the like) from the image source 304. The text detection apparatus 302 (e.g., detection circuitry 120) may be configured to perform text detection operations to detect text within the received image in accordance with any of the embodiments described herein below with respect to the text detection apparatus 102. In some example embodiments, the text detection apparatus 302 (e.g., detection circuitry 120 and/or communication interface 114) may be further configured to send results of text detection performed by the text detection apparatus 302 to the image source 304.

In some example embodiments, the image source 304 may comprise a user terminal, which may be configured to access text detection functionality that may be provided by the text detection apparatus 302. In this regard, at least some image processing operations that may be performed in accordance with some example embodiments may comprise cloud-based operations that be performed by a server. Thus, for example, in some example embodiments, text detection services may be provided to end users in accordance with some example embodiments without necessitating that the actual text detection operations be performed on the end-user's device.

As a further example, in some example embodiments of the system 300, aspects of the detection circuitry 120 may be distributed between the image source 304 and text detection apparatus 302. In this regard, tasks for performing text detection within an image in accordance with one or more example embodiments may be divided and/or otherwise distributed between the text detection apparatus 302 and image source 304.

Accordingly, it will be appreciated that where the text detection apparatus 102 is described to detect text within an image, classify whether a region of an image is a text-containing region, and/or the like, the image may, for example, comprise an image captured by the text detection apparatus 102 (for example, by the image capture circuitry 118, a locally stored image (for example, an image stored in the memory 112) that is accessible to the text detection apparatus 102, an image that may be received and/or accessed from a remote image source over a network (for example, from an image source 304), and/or the like.

In some example embodiments, the text detection apparatus 102 may be configured to detect text within an image (e.g., a still image, video, video frame, and/or the like) in accordance with a model capturing properties of text, which may be independent of fonts, styles, viewpoints, background contrasts, and/or other factors that may affect perception of text within an image. In this regard, some example embodiments may provide for text detection based at least in part on a model that may be predicated on general properties of text, which may not vary substantially between varying fonts, text styles, contrast between text and the image background, or viewpoints at which the text is captured in an image. These properties may, for example, include:

Stroke width is generally fairly constant across the text.
Character height is generally fairly constant across the text.
Character spacing is generally fairly constant.
Readability dictates that for a given text height, the corresponding stroke width and character spacing may be proportional to the height, such that the stroke width and character spacing cannot be too large or too small.
The bounding region (e.g., box) surrounding text within an image may be bimodal in intensity assuming the existence some type of background underlying the text.

Referring now to FIG. 4, FIG. 4 illustrates an example Bayesian Network for word generation in accordance with some example embodiments, which may be used to describe influencing variables and effects on text within a captured image. As illustrated in FIG. 4, any combination of one or more of the variables 402-418 may influence the text geometry 320. More particularly, the variables influencing the text geometry 320 may include the alphabet 402 (e.g., Latin alphabet, Chinese alphabet, Cyrillic alphabet, and/or the like) used for the text, the style 404 (e.g., bold, italic, and/or the like) of the text, the font 406 used for the text, the height 408 of a text box or other region encompassing the text (e.g., the height of a character of the text), the length of the strokes 410 that comprise a character the text, the scaled stroke width 412 of a character of text, the spacing 414 between characters of the text, the character width 416 for a character, and the number of characters 418 in the text fragment.

The text geometry 420 may, along with text appearance factors, such as the background color 422 and text color 424, in turn affect the properties of a three-dimensional (3D) text fragment 426, as it may exist in the real world. In turn, generation of a two-dimensional (2D) text fragment 434 that may be captured in an image of the 3D text fragment 426 may be influenced by the real-world appearance of the 3D text fragment 426 and variables, such as the variables 428-432, which may affect the imaging process by which the image is captured. More particularly, variables that may affect the imaging process may include the viewpoint 428 from which the image was captured, camera photometry properties 430, illumination 432 of the scene of the captured image, and/or the like.

Given the above-described Bayesian network, several random variables may be defined in accordance with some example embodiments, which may describe inherent geometric properties of text. These variables may include:

H=Height of a character (e.g., node 408 in FIG. 4)
L=$\lambda$H=One dimensional (1D) length of a character, which may be defined as the total curved length of the character's skeleton (e.g., node 410 in FIG. 4)
B=$\beta$H=Width of a character (e.g., node 416 in FIG. 4)
S=$\psi$H=Stroke width of a character (e.g., node 412 in FIG. 4)
D=$\delta$H=Spacing between neighboring characters (e.g., node 414 in FIG. 4)
m=Number of characters in a word or other text fragment (e.g., node 418 in FIG. 4)

The quantities $\lambda$, $\beta$, $\psi$, and $\delta$ in the preceding definitions may be defined as random variables denoting respective text properties. In this regard, $\lambda$ may denote the character length relative to text height. $\beta$ may denote the character length relative to the text height. $\psi$ may denote the character width relative to the text height. $\delta$ may denote an inter-character spacing relative to the text height. Given a choice of alphabet (e.g. English, Chinese etc.), style (i.e. bold, italic, regular), and font (e.g. Arial, Courier, etc.), the choice may map to probability distributions for $\lambda$, $\beta$, $\psi$, and $\delta$. Accordingly, given a number of characters, m, m instances may be drawn from the four probability distributions to create a set of characters for the word. Accordingly, some example embodiments may use these geometric properties of text to provide for detection of text in a manner that may be robust to text appearance influencing variables, such as background color 422 and text color 424, as well as to imaging process influencing variables, such as the viewpoint 428, camera photometry 430, and illumination 432.

In this regard, in accordance with some example embodiments, a text fragment within an image may be modeled using an alpha value ($\alpha$) that may be defined as a random variable that is a function of the curved character length distribution ($\lambda$), the character width distribution ($\beta$), and the inter-character spacing distribution ($\delta$), which as discussed in the context of FIG. 4, may be inherent properties of the text given a specific alphabet, font, and style. Derivation of the alpha value may be demonstrated as follows.

Given a word or other text fragment within an image, the area occupied by the characters of the text fragment within an image region containing the text fragment (e.g., a text box) may be defined as follows:

$$A_T \approx mLS$$

$$\approx m\lambda\psi H^2 \quad [1]$$

The area occupied by the total image region containing the text fragment (e.g., the text box) may be defined as follows:

$$A_B = HW$$

$$\approx mH(B+D)$$

$$\approx mH^2(\beta+\delta) \quad [2]$$

The ratio of the area occupied by the image region containing the text fragment to the area of occupied by the text fragment may be referred to as the occupancy ratio ($\omega$). The occupancy ratio may be defined as follows:

$$\frac{A_T}{A_B} \approx \frac{m\lambda\psi H^2}{m(\beta+\delta)H^2} \quad [3]$$

$$\approx \frac{\lambda\psi}{\beta+\delta}$$

The detection circuitry 120 may be configured to compute the occupancy ratio from the text fragment trivially. For example, the detection circuitry 120 may be configured to count an area occupied by pixels of the text fragment and an area occupied by pixels with the image region (e.g., text box) containing the text fragment. Accordingly, the occupancy ratio may be calculated without directly calculating the quantities $\lambda$, $\beta$, $\psi$, and $\delta$.

Given the occupancy ratio and the stroke width, $\psi$, the alpha value may accordingly be defined as:

$$\alpha = \frac{A_T}{\psi A_B} \approx \frac{\lambda}{\beta+\delta} \quad [4]$$

Accordingly, as demonstrated, the alpha value may be defined as a function of the curved character length distribution ($\lambda$), the character width distribution ($\beta$), and the inter-character spacing distribution ($\delta$), which are inherent properties of the text, given a specific alphabet, font, and style. The alpha value is invariant to the stroke width, which may exhibit more significant variations. In accordance with some example embodiments, it is expected that across different fonts and styles within a given alphabet, the constraint of readability restricts the spread of $\alpha$. Accordingly, as will be described further herein below, the alpha value may be used by the detection circuitry 120 in some example embodiments to facilitate text detection within an image.

It will be noted, however, that, as demonstrated by equation [4], computational complexity may be reduced such that the detection circuitry 120 may calculate the alpha value based on the occupancy ratio and the stroke width without having to calculate the curved character length distribution ($\lambda$), the character width distribution ($\beta$), and the inter-character spacing distribution ($\delta$). In this regard, the occupancy ratio may be trivially calculated by the detection circuitry as previously noted. The detection circuitry 120 may be configured to calculate the stroke width, $\psi$, for a given text fragment, or hypothesized text fragment in any of a variety of ways in order to calculate the alpha value. For example, stroke width for a given text fragment may be determined based at least in part on one or more scan lines that may be applied across a text fragment. In some example embodiments, the stroke width may be calculated by applying a Euclidean distance transform to the binary image of the image region to label each foreground pixel (e.g., hypothesized text pixel) with the distance to its nearest background pixel. The distance value may reach a maximum along the centerline of the stroke. As such, the maximum value may correspond to half the width of the stroke. Accordingly, stroke width may be determined based at least in part on this maximum value. For example, in some example embodiments, the stroke width information may be propagated from the maximum value pixels to the boundary of the hypothesized text along the "downhill" direction to facilitate determination of the stroke width. The detection circuitry 120 may accordingly be configured in some example embodiments to calculate the alpha value by dividing the occupancy ratio for a text fragment by the stroke width for the text fragment, such as in equation [4].

Having now described how a geometric attributes of text may be applied to determine an alpha value that may be used to model text, the application of the alpha value to facilitate detection of text within an image in accordance with some example embodiments will now be described. In some example embodiments, the detection circuitry 120 may be configured to determine an image region containing a hypothesized text fragment. The image region may, for example, comprise a text box. However, it will be appreciated that any geometric region within an image that contains a hypothesized text fragment may be determined in accordance with some example embodiments.

In some example embodiments, the detection circuitry 120 may be configured to determine an image region by receiving an image region identified by a separate text hypothesis generator configured to implement a text hypothesis generator that may detect likely text characters and their locations within an image. In this regard, the text hypothesis generator may be configured to provide an identified image region containing a hypothesized text fragment to the detection circuitry 120 for classification of whether the hypothesized text fragment within the image region is text. The separate text hypothesis generator may, for example, be implemented on the text detection apparatus 102, and may be implemented by processor 110. Alternatively, the text hypothesis generator by be implemented on a separate entity, such as the image source 304, which may be remote from the text detection apparatus 102.

Additionally or alternatively, in some example embodiments, the detection circuitry 120 may be configured to analyze an image and identify an image region within the image hypothesized to contain a text fragment. In this regard, in some example embodiments, the detection circuitry 120 may be configured to implement a text hypothesis generator that may identify hypothesized text characters and their locations within an image for classification of whether the hypothesized text is actually text. In identifying the image region, the detection circuitry 120 may, for example, be configured to apply a region-based text detection technique to the image, such as by applying a sliding window over the image and identifying whether the image region within the window contains a hypothesized text fragment or not. Additionally or alternatively, the detection circuitry 120 may be configured to identify an image region containing a hypothesized text fragment by utilizing a connected component-based text detection technique.

In some example embodiments, the detection circuitry 120 may be configured to binarize an image region containing a hypothesized text fragment to derive a binary image. The detection circuitry 120 may binarize the image region using any technique for binarizing an image. In some example embodiments, the detection circuitry 120 may be configured to use Otsu's method. However, it will be appreciated that other techniques may be used in addition to or in lieu of Otsu's method in accordance with various example embodiments.

The detection circuitry 120 may be further configured to determine based at least in part on the binary image whether the image region containing the hypothesized text fragment is describable using two, and only two, probability distributions. In this regard, the detection circuitry 120 may, for example, verify that the image region containing hypothesized text arises from a binary signal. The detection may be configured to verify that the image content within the image region box arises from a binary signal by calculating the variance of the hypothesized text characters and the variance of the background separately and texting the variances against an estimated sensor noise for the image region. The detection circuitry 120 may be configured to calculate the sensor noise from the image region using any available technique. For example, the detection circuitry 120 may segment the image into several coherent regions and obtain a sensor noise estimate from each region and fuse the estimates together. The regions at the junctions between the hypothesized character(s) and background may have a blend of both signals and may be unreliable for variance calculation. Accordingly, in some example embodiments, in order to calculate character variance, the detection circuitry 120 may be configured to morphologically erode the hypothesized text characters before calculating their variance. Further, in order to calculate the background variance, the detection circuitry 120 may be configured to morphologically dilate the characters and subtract them from the image region (e.g., the text box) before calculating the background variance.

In an instance in which it is determined that an image region containing hypothesized text is not describable using only two probability distributions, the detection circuitry 120 may be configured to classify the image region as a non-text-containing region. In this regard, the detection circuitry 120 may regard the hypothesized text as non-text objects captured within the image, and may forego performing further text detection analysis of the image region.

If, however, it is determined that the image region containing hypothesized text is describable using only two probability distributions, the detection circuitry 120 may use the binarized image of the image region to calculate values that may be used to classify whether the image region is a text-containing region (e.g., whether the hypothesized text is actually text). In this regard, the detection circuitry 120 may apply at least one scan line across the hypothesized text fragment within the binary image. In this regard, the hypothesized characters may be intersected with one or more scan lines, which may be oriented in substantially the same orientation as the hypothesized text. For example, FIG. 5 illustrates application of a scan line across a hypothesized text fragment in accordance with some example embodiments. In this regard, FIG. 5 illustrates an image region 502 containing a hypothesized text fragment ("TEXT"). As illustrated, the image region 502 has been binarized such that the background is illustrated in black, while the hypothesized text fragment is illustrated in white. The scan line 504 has been applied across the hypothesized text fragment.

The detection circuitry 120 may be configured to determine at least one property of the hypothesized text fragment based at least in part on the applied at least one scan line. The detection circuitry 120 may be configured to use the determined at least one property to determine one or more values that may be used to classify whether the hypothesized text fragment is actually text.

By way of example, in some example embodiments, the detection circuitry 120 may be configured to use the applied at least one scan line to calculate the stroke width, $\psi$, for the hypothesized text fragment. The detection circuitry 120 may use the calculated stroke width to determine the alpha value for the hypothesized text fragment in accordance with equation [4]. In this regard, the detection circuitry 120 may calculate the occupancy ratio defining the ratio of the area of the image region occupied by the hypothesized text fragment to the total area of the determined region, and may divide the occupancy ratio by the calculated stroke width to determine the alpha value.

In some example embodiments, the detection circuitry 120 may be configured to calculate the alpha value without calculating the stroke width. In this regard, as already noted, the alpha value may be described as a function of the curved character length distribution, $\lambda$. The curved length of a character may be calculated by skeletonizing it and counting the number of pixels in the skeleton. However, skeletonization typically does not produce the intuitively expected skeleton, especially for complex shapes. It may be observed, however, that a character stroke is generated by moving a 'pen' of a given thickness (e.g., the stroke width) along the character's skeleton. Given that the stroke width is nearly constant, the curved length ($\lambda H$) is half the perimeter of the character (assuming that the stroke width is small relative to the perimeter). Perimeter calculation can accordingly be performed by intersecting the hypothesized text characters using a randomized collection of substantially parallel scan lines of spacing d to obtain a number of intersections N. The curved length of all of the characters in the hypothesized text fragment may accordingly be defined as:

$$m\lambda H = \frac{\pi dN}{4} \quad [5]$$

In view of equation [5], the alpha value may be expressed as:

$$\alpha = \frac{\lambda}{\beta + \delta} \quad [6]$$
$$= \frac{(m\lambda H)H}{m(\beta + \delta)H^2}$$
$$= \frac{\pi dNH}{4A_B}$$

Accordingly, in some example embodiments, the detection circuitry 120 may be configured to calculate the number of intersections, N, of some random number of substantially parallel scan lines intersecting the hypothesized text characters. The intersecting lines may be characterized by their inter-line spacing, d. The detection circuitry 120 may be further configured to calculate the total perimeter of the image region containing the hypothesized text fragment. While any number of such lines may be used, in some example embodiments, a number of lines with inter-line spacing d that is sufficient to substantially fill (e.g., cover) the image region may be used. For example, in some example embodiments, 10 or more lines may be used to intersect the hypothesized text fragment. The detection circuitry 120 may accordingly use the calculated number of intersections and the calculated total area of the image region to calculate the alpha value in accordance with equation [6].

As a further example, in some example embodiments, the detection circuitry 120 may be configured to use at least one scan line applied to the binary image of the image region to determine an interval length distribution for the hypothesized text fragment. For example, referring again to FIG. 5, the interval length distribution 506 illustrates an example interval length distribution that may be determined for the hypothesized text fragment using the scan line 504. The detection circuitry 120 may be configured to calculate a gamma value ($\gamma$) based at least in part on the interval length distribution determined for the hypothesized text fragment. For example, in some example embodiments, the detection circuitry 120 may be configured to determine a mean of a distribution of the interval length divided by the text height (H), which may be noted as "$\mu$," and derived as follows:

$\mu$=Mean of (interval length/text height) distribution. [7]

The detection circuitry may be further configured to calculate a standard deviation of the distribution of the interval length divided by the text height (H), which may be noted as "$\sigma$" and derived as follows:

$\sigma$=Standard Deviation of (interval length/text height) distribution. [8]

The detection circuitry 120 may be configured to use the calculated $\mu$ and $\sigma$ to calculate the gamma value as follows:

$\gamma = \sigma/\mu$ [9]

In this regard, the gamma value may comprise a ratio of the mean of the interval length distribution to the standard deviation of the interval length distribution, which may capture the signal-noise ratio of the interval lengths.

The detection circuitry 120 may be further configured to use the calculated alpha and gamma values to classify whether the image region is a text-containing region (e.g., whether the hypothesized text is actually text). In this regard, the alpha and gamma values may be used as a model of text that may be used to discriminate text from non-text. As illustrated in FIG. 6, alpha and gamma values exhibit a substantially compact distribution for text, relative to non-text, for a set of training data text including samples spanning widely different fonts, styles, spacing, and sizes. In this regard, the scatter plot 602 and histogram 604 illustrate that the calculated alpha values for text samples in the training data set are substantially clustered about α=0.5, while alpha values calculated for non-text samples of the training data set are widely dispersed, and not frequently close to 0.5. Similarly, the scatter plot 606 and histogram 608 illustrate that the calculated gamma values for text samples in the training data set are substantially clustered about γ=0.5, while gamma values calculated for non-text samples of the training data set are widely dispersed, and not frequently close to 0.5.

Given these results for a training data set containing a wide range of text, alpha and gamma values calculated for a hypothesized text fragment may be used to classify whether an image region containing hypothesized text fragment is actually a text-containing region. For example, the detection circuitry 120 may be configured to determine whether alpha and gamma values calculated for a hypothesized text fragment satisfy a defined threshold relationship to expected alpha and gamma values. The threshold relationship may, for example, define a tolerance range that may define a range of values from some threshold value less than an expected value to a threshold value greater than the expected value. In this regard, if the calculated alpha and gamma values fall within the tolerance ranges for the expected alpha and gamma values, the image region containing the hypothesized text fragment may be classified as a text-containing region. Alternatively, if the calculated alpha value and/or the calculated gamma value do not fall within the tolerance range the image region containing the hypothesized text fragment may be classified as a non-text-containing region. Accordingly, a tolerance range may be adjusted in accordance with how many false positives are considered tolerable. For example, if a greater number of false positives (e.g., a percentage of false positives) are tolerated, a larger tolerance range may be used. However, if fewer false positives (e.g., a percentage of false positives) are tolerated, a smaller tolerance range may be used.

In some example embodiments, a Gaussian distribution function (e.g., a two-dimensional Gaussian distribution function) may be derived from a training data set to represent expected alpha and gamma values for text. The detection circuitry 120 may be configured to apply the Gaussian distribution function to alpha and gamma values calculated for a hypothesized text fragment. If the Gaussian distribution function is fit to a calculated set of alpha and gamma values, the image region containing the hypothesized text fragment may be classified as a text-containing region. If, however, the calculated alpha and/or calculated gamma value are outlying values which may not be fit to the Gaussian distribution function, the image region containing the hypothesized text fragment may be classified as a non-text-containing region.

FIG. 7 illustrates an example scatterplot of α and γ for text and non-text samples within a training data set. Each quantity being reasonably well described by a normal distribution, this scatterplot implies that ellipsoids around their mean enclose a corresponding fraction of text fragments. Accordingly, an acceptable detection rate (e.g. 0.9) may be selected, which would define the acceptable range of α and γ values for that detection rate. Accordingly, in some example embodiments, this property may be used to set a tolerance rate for false positives, which may be used to define the tolerance range of alpha and gamma values, the spread of a distribution function to which calculated alpha and gamma values may be fit, and/or other quality that may be used to define a range of alpha and gamma values for a hypothesized text fragment that may be positively classified as text. If the detection rate is set to a lower value, fewer false positives may be detected, but at the expense of classifying some text-containing regions as non-text-containing regions. If, however, the detection rate is set to a higher value, a greater percentage of actual text regions will be classified as text-containing regions, but at the expense of more false positive results.

FIG. 8 illustrates sample classification results in accordance with some example embodiments. In this regard, the image regions 802, 804, 806, and 808 may be initially identified as image regions containing hypothesized text fragments. Alpha and gamma values may be calculated for the image regions 802-808 and used to classify the image regions in accordance with an example embodiment. In the example image illustrated in FIG. 8, the image regions 802, 804, and 806 may be classified as text-containing regions, while the image region 808 may be classified as a non-text-containing region.

Accordingly, in some example embodiments, alpha and gamma values calculated for a training data set may be used as a model for classification of a hypothesized text fragment within an image. While several of the above examples have been described with respect to a general text model generated from a training data set containing a wide variety of different fonts, styles, spacing, and sizes, as illustrated in FIGS. 6-7, in some example embodiments, more tailored models may be developed for specific target fonts, target font styles, some combination thereof, or the like. In this regard, a model of alpha and gamma values may be developed using a more narrowly tailored data set. These more tailored models may be used to detect specific target font types, styles, text size, and/or the like within an image. However, as will be appreciated from the examples described above, several example embodiments may utilize a general text model to detect text based on general property of texts, which may be substantially invariant for different font types, styles, and text size, as illustrated and described with respect to FIG. 4.

In some example embodiments, the detection circuitry 120 may be configured to perform text detection within a 3D image. The 3D image may, for example, comprise a 2D image and a corresponding depth image. The detection circuitry 120 may be configured to use the depth image to manipulate a viewpoint of an image region within the image to facilitate classification of a hypothesized text fragment within the image region.

FIG. 9 illustrates a flowchart according to an example method facilitating detection of text within an image according to some example embodiments. In this regard, FIG. 9 illustrates operations that may be performed at a communication apparatus 102. The operations illustrated in and described with respect to FIG. 9 may, for example, be performed by, with the assistance of, and/or under the control of one or more of the processor 110, memory 112, communication interface 114, user interface 116, image capture circuitry 118, or detection circuitry 120. Operation 900 may comprise calculating an alpha value associated with an image region containing a hypothesized text fragment. The processor 110, memory 112, and/or detection circuitry 120 may, for example, provide means for performing operation 900. Operation 910 may comprise calculating a gamma value based at least in part on an interval length distribution for the hypothesized text fragment. The processor 110, memory 112, and/or detection circuitry 120 may, for example, provide means for performing operation 910. Operation 920 may comprise classifying whether the image region is a text-containing region based at least in part on the calculated alpha and gamma values. The processor 110, memory 112, and/or detection circuitry 120 may, for example, provide means for performing operation 920.

FIG. 10 illustrates a flowchart according to another example method facilitating detection of text within an image according to some example embodiments. In this regard, FIG. 10 illustrates operations that may be performed at a communication apparatus 102. The operations illustrated in and described with respect to FIG. 10 may, for example, be performed by, with the assistance of, and/or under the control of one or more of the processor 110, memory 112, communication interface 114, user interface 116, image capture circuitry 118, or detection circuitry 120. Operation 1000 may comprise binarizing an image region containing a hypothesized text fragment. The processor 110, memory 112, and/or detection circuitry 120 may, for example, provide means for performing operation 1000. Operation 1010 may comprise verifying that the image region is describable by two, and only two, probability distributions. The processor 110, memory 112, and/or detection circuitry 120 may, for example, provide means for performing operation 1010. Operation 1020 may comprise applying one or more scan lines to the hypothesized text fragment. The processor 110, memory 112, and/or detection circuitry 120 may, for example, provide means for performing operation 1020. Operation 1030 may comprise using the scan line(s) as a basis to calculate properties of the hypothesized text fragment to enable calculation of alpha and gamma values. The processor 110, memory 112, and/or detection circuitry 120 may, for example, provide means for performing operation 1030. Operation 1040 may comprise calculating alpha and gamma values for the hypothesized text fragment based at least in part on the properties calculated based on the scan line(s). The processor 110, memory 112, and/or detection circuitry 120 may, for example, provide means for performing operation 1040. Operation 1050 may comprise classifying whether the image region is a text-containing region based at least in part on the calculated alpha and gamma values. The processor 110, memory 112, and/or detection circuitry 120 may, for example, provide means for performing operation 1050.

FIGS. 9-10 are flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a text detection apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, a text detection apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out various embodiments. In some embodiments, a suitably configured processor (for example, the processor 110) may provide all or a portion of the elements. In other embodiments, all or a portion of the elements may be configured by and operate under control of a computer program product. The computer program product for performing the methods of embodiments of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
calculating an alpha value associated with an image region containing a hypothesized text fragment, the alpha value being defined as a function of a curved character length distribution, a character width distribution, and an inter-character spacing distribution for the hypothesized text fragment;

calculating a gamma value based at least in part on an interval length distribution determined for the hypothesized text fragment; and classifying, by a processor, whether the image region is a text-containing region based at least in part on the calculated alpha and gamma values.

2. The method of claim 1, wherein calculating the alpha value comprises calculating the alpha value without directly calculating the curved character length distribution, the character width distribution, or the inter-character spacing distribution for the hypothesized text fragment.

3. The method of claim 1, wherein calculating the alpha value comprises calculating the alpha value based at least in part on an occupancy ratio defining a ratio of an area of the determined image region occupied by the hypothesized text fragment to a total area of the determined image region and on a stroke-width for the hypothesized text fragment.

4. The method claim 1, wherein calculating the alpha value comprises calculating the alpha value based at least in part on a total area of the determined image region and a number of intersections of a plurality of substantially parallel lines characterized by an inter-line spacing passing through at least one hypothesized character of the hypothesized text fragment.

5. The method of claim 1, wherein calculating the gamma value based at least in part on the interval length distribution comprises calculating a ratio of a mean of a distribution of the interval length divided by a text height to a standard deviation of the distribution of the interval length divided by a text height.

6. The method of claim 1, further comprising:
applying at least one scan line across the hypothesized text fragment;
determining at least one property of the hypothesized text fragment based at least in part on the applied at least one scan line; and
wherein calculating the alpha and gamma values comprises calculating the alpha and gamma values based at least in part on the determined at least one property of the hypothesized text fragment.

7. The method of claim 1, further comprising:
deriving a binary image by binarizing the determined image region;
determining, based at least in part on the binary image, whether the image region is describable using only two probability distributions;
using the binary image to calculate the alpha value and to calculate the gamma value only in an instance in which it is determined that the image region is describable using only two probability distributions; and
classifying the image region as a non-text-containing region in an instance in which the image region is not describable using only two probability distributions.

8. The method of claim 1, wherein classifying whether the image region is a text-containing region based at least in part on the calculated alpha and gamma values comprises:
determining whether the calculated alpha and gamma values satisfy a defined threshold relationship to expected alpha and gamma values;
classifying the image region as a text-containing region in an instance in which it is determined that the calculated alpha and gamma values satisfy the threshold relationship to expected alpha and gamma values; and
classifying the image region as a non-text-containing region in an instance in which it is determined that the calculated alpha and gamma values do not satisfy the threshold relationship to expected alpha and gamma values.

9. The method of claim 1, wherein classifying whether the image region is a text-containing region based at least in part on the calculated alpha and gamma values comprises:
applying a Gaussian distribution function;
classifying the image region as a text-containing region in an instance in which the calculated alpha and gamma values satisfy a threshold relationship to the Gaussian distribution function; and
classifying the image region as a non-text-containing region in an instance in which the calculated alpha and gamma values do not satisfy a threshold relationship to the Gaussian distribution function.

10. An apparatus comprising at least one processor and at least one memory storing computer program code, wherein the at least one memory and stored computer program code are configured, with the at least one processor, to cause the apparatus to at least:
calculate an alpha value associated with an image region containing a hypothesized text fragment, the alpha value being defined as a function of a curved character length distribution, a character width distribution, and an inter-character spacing distribution for the hypothesized text fragment;
calculate a gamma value based at least in part on an interval length distribution determined for the hypothesized text fragment; and classify whether the image region is a text-containing region based at least in part on the calculated alpha and gamma values.

11. The apparatus of claim 10, wherein the at least one memory and stored computer program code are configured, with the at least one processor, to cause the apparatus to calculate the alpha value without directly calculating the curved character length distribution, the character width distribution, or the inter-character spacing distribution for the hypothesized text fragment.

12. The apparatus of claim 10, wherein the at least one memory and stored computer program code are configured, with the at least one processor, to cause the apparatus to calculate the alpha value based at least in part on an occupancy ratio defining a ratio of an area of the determined image region occupied by the hypothesized text fragment to a total area of the determined image region and on a stroke-width for the hypothesized text fragment.

13. The apparatus of claim 10, wherein the at least one memory and stored computer program code are configured, with the at least one processor, to cause the apparatus to calculate the alpha value based at least in part on a total area of the determined image region and a number of intersections of a plurality of substantially parallel lines characterized by an inter-line spacing passing through at least one hypothesized character of the hypothesized text fragment.

14. The apparatus of claim 10, wherein the at least one memory and stored computer program code are configured, with the at least one processor, to cause the apparatus to calculate the gamma value based at least in part on the interval length distribution at least in part by calculating a ratio of a mean of a distribution of the interval length divided by a text height to a standard deviation of the distribution of the interval length divided by a text height.

15. The apparatus of claim 10, wherein the at least one memory and stored computer program code are configured, with the at least one processor, to further cause the apparatus to:
apply at least one scan line across the hypothesized text fragment;

determine at least one property of the hypothesized text fragment based at least in part on the applied at least one scan line; and calculate the alpha and gamma values at least in part by calculating the alpha and gamma values based at least in part on the determined at least one property of the hypothesized text fragment.

16. The apparatus of claim 10, wherein the at least one memory and stored computer program code are configured, with the at least one processor, to further cause the apparatus to:

derive a binary image by binarizing the determined image region;

determine, based at least in part on the binary image, whether the image region is describable using only two probability distributions;

use the binary image to calculate the alpha value and to calculate the gamma value only in an instance in which it is determined that the image region is describable using only two probability distributions; and classify the image region as a non-text-containing region in an instance in which the image region is not describable using only two probability distributions.

17. The apparatus of claim 10, wherein the at least one memory and stored computer program code are configured, with the at least one processor, to further cause the apparatus to classify whether the image region is a text-containing region based at least in part on the calculated alpha and gamma values at least in part by:

determining whether the calculated alpha and gamma values satisfy a defined threshold relationship to expected alpha and gamma values;

classifying the image region as a text-containing region in an instance in which it is determined that the calculated alpha and gamma values satisfy the threshold relationship to expected alpha and gamma values; and classifying the image region as a non-text-containing region in an instance in which it is determined that the calculated alpha and gamma values do not satisfy the threshold relationship to expected alpha and gamma values.

18. The apparatus of claim 10, wherein the at least one memory and stored computer program code are configured, with the at least one processor, to further cause the apparatus to classify whether the image region is a text-containing region based at least in part on the calculated alpha and gamma values at least in part by:

applying a Gaussian distribution function;

classifying the image region as a text-containing region in an instance in which the calculated alpha and gamma values satisfy a threshold relationship to the Gaussian distribution function; and classifying the image region as a non-text-containing region in an instance in which the calculated alpha and gamma values do not satisfy a threshold relationship to the Gaussian distribution function.

19. The apparatus of claim 10, wherein the apparatus comprises or is embodied on a mobile computing device, the mobile computing device comprising user interface circuitry and user interface software stored on one or more of the at least one memory; wherein the user interface circuitry and user interface software are configured to:

facilitate user control of at least some functions of the mobile computing device through use of a display; and cause at least a portion of a user interface of the mobile computing device to be displayed on the display to facilitate user control of at least some functions of the mobile computing device.

20. A computer program product comprising at least one non-transitory computer-readable storage medium having computer-readable program instructions stored therein, the computer-readable program instructions comprising:

program instructions configured to calculate an alpha value associated with an image region containing a hypothesized text fragment, the alpha value being defined as a function of a curved character length distribution, a character width distribution, and an inter-character spacing distribution for the hypothesized text fragment;

program instructions configured to calculate a gamma value based at least in part on an interval length distribution determined for the hypothesized text fragment; and program instructions configured to classify whether the image region is a text-containing region based at least in part on the calculated alpha and gamma values.

* * * * *